US012470024B2

(12) United States Patent
Matsuda et al.

(10) Patent No.: US 12,470,024 B2
(45) Date of Patent: Nov. 11, 2025

(54) SHIELD CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Hidekazu Matsuda, Mie (JP); Kazuki Hiramatsu, Mie (JP); Taiga Kadoyama, Mie (JP); Masanao Yamashita, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 489 days.

(21) Appl. No.: 17/868,128

(22) Filed: Jul. 19, 2022

(65) Prior Publication Data

US 2023/0031237 A1 Feb. 2, 2023

(30) Foreign Application Priority Data

Jul. 27, 2021 (JP) ................................ 2021-122066

(51) Int. Cl.

| | |
|---|---|
| ***H01R 13/6582*** | (2011.01) |
| ***H01R 13/05*** | (2006.01) |
| ***H01R 13/11*** | (2006.01) |
| ***H01R 13/502*** | (2006.01) |
| ***H01R 13/6591*** | (2011.01) |

(52) U.S. Cl.
CPC ......... *H01R 13/6582* (2013.01); *H01R 13/05* (2013.01); *H01R 13/11* (2013.01); *H01R 13/502* (2013.01); *H01R 13/65912* (2020.08)

(58) Field of Classification Search
CPC .... H01R 13/6582; H01R 13/05; H01R 13/11; H01R 13/502; H01R 13/65915; H01R 13/65912
See application file for complete search history.

(56) References Cited

U.S. PATENT DOCUMENTS

2019/0288456 A1* 9/2019 Maesoba ............. H01R 13/424

FOREIGN PATENT DOCUMENTS

JP 2005-347191 A 12/2005

* cited by examiner

*Primary Examiner* — Renee S Luebke
*Assistant Examiner* — Paul D Baillargeon
(74) *Attorney, Agent, or Firm* — Venjuris, P.C.

(57) ABSTRACT

A male connection surface of the male dielectric and a female connection surface of the female dielectric are facing each other and an elongated tab of the male inner conductor projects from the male connection surface and is inserted in the female inner conductor with the male connector and the female connector connected. A thin portion shaped by cutting an outer surface of the male dielectric and configured to surround a base end portion of the tab is formed on an end part of the male dielectric on the side of the male connection surface. The female outer conductor is formed with an impedance adjusting portion configured to proximately cover an outer surface of the thin portion.

3 Claims, 6 Drawing Sheets

SHIELD CONNECTOR

CROSS-REFERENCE TO RELATED APPLICATIONS

This application is based on and claims priority from Japanese Patent Application No. 2021-122066, filed on Jul. 27, 2021, with the Japan Patent Office, the disclosure of which is incorporated herein in its entirety by reference.

TECHNICAL FIELD

The present disclosure relates to a shield connector.

BACKGROUND

Japanese Patent Laid-open Publication No. 2005-347191 discloses a shield connector in which a male inner conductor terminal and a female inner conductor terminal are connected by inserting an elongated tab portion of the male inner conductor terminal into a rectangular tube portion of the female inner conductor terminal and a connected part of the both inner conductor terminals is surrounded by a male outer conductor terminal and the female inner conductor terminal.

SUMMARY

With the male inner conductor terminal and the female inner conductor terminal connected, a male space portion adjacent to a proper connection surface is formed. Since a large air layer is interposed between the male inner conductor terminal and the male outer conductor terminal in this male space portion, impedance is increased. In contrast, in a region of a male connector opposite to the proper connection surface across the male space portion, impedance is lower than in the male space portion since a male dielectric made of synthetic resin is interposed between the male inner conductor terminal and the male outer conductor terminal.

A shield connector of the present disclosure was completed on the basis of the above situation and aims to reduce impedance mismatching.

The present disclosure is directed to a shield connector with a male connector including a male inner conductor, a male dielectric and a male outer conductor, and a female connector including a female inner conductor, a female dielectric and a female outer conductor, wherein a male connection surface of the male dielectric and a female connection surface of the female dielectric are facing each other and an elongated tab of the male inner conductor projects from the male connection surface and is inserted in the female inner conductor with the male connector and the female connector connected, a thin portion shaped by cutting an outer surface of the male dielectric and configured to surround a base end portion of the tab is formed on an end part of the male dielectric on the side of the male connection surface, and at least one of the female outer conductor and the male outer conductor is formed with an impedance adjusting portion configured to cover an outer surface of the thin portion while being proximate to or in contact with the outer surface of the thin portion.

According to the present disclosure, it is possible to reduce impedance mismatching.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
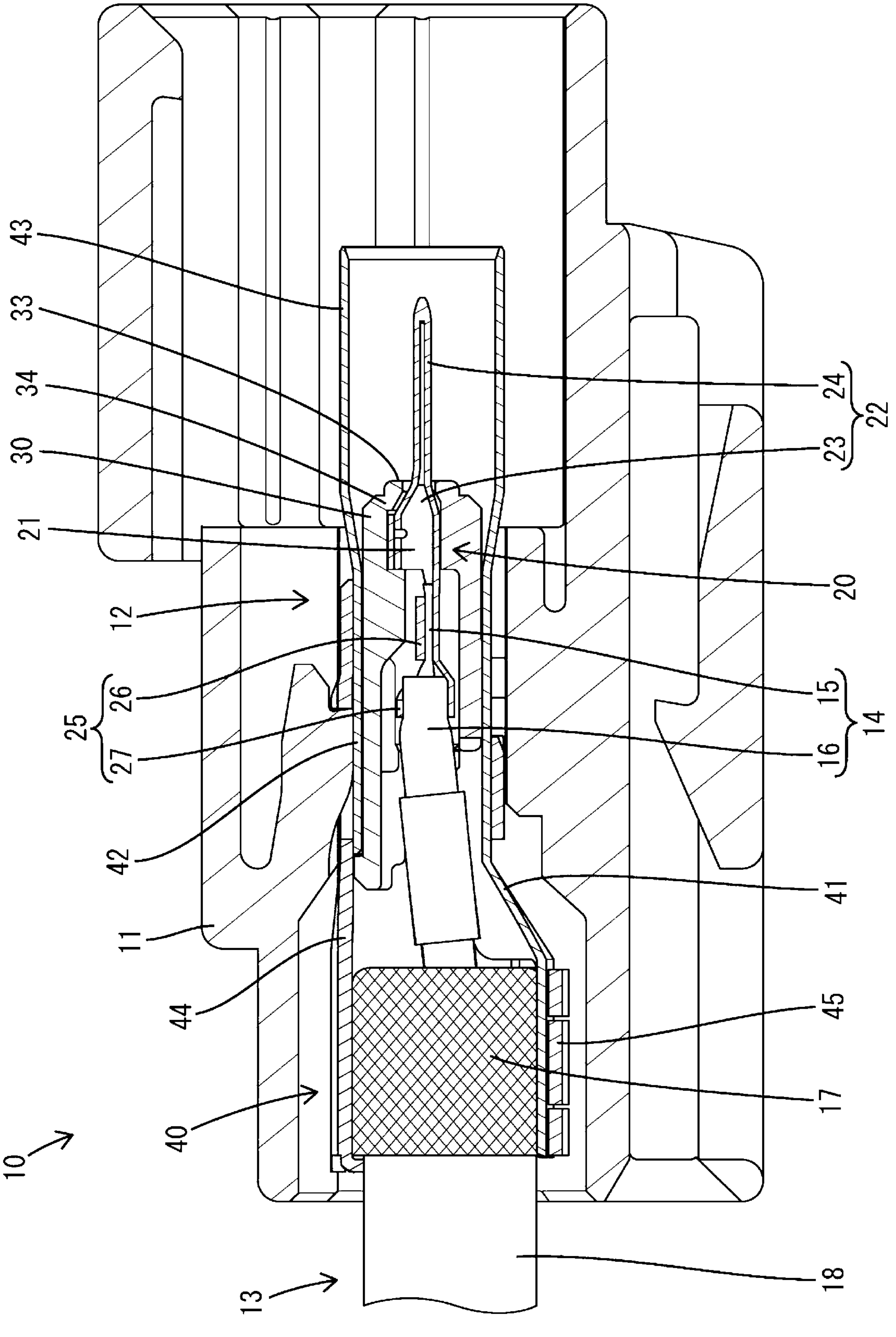
FIG. 1 is a side view in section of a male connector of one embodiment.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Description of Embodiments of Present Disclosure

First, embodiments of the present disclosure are listed and described.

(1) The shield connector of the present disclosure is provided with a male connector including a male inner conductor, a male dielectric and a male outer conductor, and a female connector including a female inner conductor, a female dielectric and a female outer conductor, wherein a male connection surface of the male dielectric and a female connection surface of the female dielectric are facing each other and an elongated tab of the male inner conductor projects from the male connection surface and is inserted in the female inner conductor with the male connector and the female connector connected, a thin portion shaped by cutting an outer surface of the male dielectric and configured to surround a base end portion of the tab is formed on an end part of the male dielectric on the side of the male connection surface, and at least one of the female outer conductor and the male outer conductor is formed with an impedance adjusting portion configured to cover an outer surface of the thin portion while being proximate to or in contact with the outer surface of the thin portion.

According to the configuration of the present disclosure, impedance is relatively low in a region of the male connector opposite to the male connection surface across the base end portion of the tab since outside dimensions of the male inner conductor are larger than those of the tab and a metal amount of the male inner conductor is more than that of the tab. On the other hand, the thin portion configured to surround the base end portion of the tab is shaped by cutting the outer surface of the male dielectric and the impedance adjusting portion is arranged at a position near the base end portion of the tab on an end part of the male connector on the side of the male connection surface, i.e. in a region where the base end portion of the tab is present. Further, since the impedance adjusting portion covers the outer surface of the thin portion while being proximate to or in contact with the outer surface of the thin portion, a large air layer is not interposed between the impedance adjusting portion and the base end portion of the tab. Therefore, impedance of the region where the base end portion of the tab is present is also relatively low. According to the present disclosure, impedance mismatching can be reduced.

(2) Preferably, the impedance adjusting portion is formed on an end part of the female outer conductor on the side of the female connection surface. According to this configuration, since the impedance adjusting portion can be formed without cutting out the female outer conductor, a reduction in shielding performance due to the formation of the impedance adjusting portion can be avoided.

(3) Preferably, in (2), a parallel surface parallel to a connecting direction of the male connector and the female connector and positioned to be proximate to or in contact with the impedance adjusting portion is formed on the outer surface of the thin portion. According to this configuration, there is no possibility that the impedance adjusting portion and the outer surface of the thin portion interfere with each other when the male connector and the female connector are relatively displaced in a connecting or separating direction.

(4) Preferably, in (2) or (3), the impedance adjusting portion covers an outer surface of the female dielectric while being proximate to or in contact with the outer surface of the female dielectric. According to this configuration, since a large air layer is not interposed between the impedance adjusting portion and the outer peripheral surface of the female dielectric, an increase in impedance due to the interposed air layer can be suppressed.

(5) Preferably, in (2) to (4), the female outer conductor is accommodated inside the male outer conductor with the male connector and the female connector connected, and the impedance adjusting portion is inclined inwardly to approach the tab toward the side of the male connector. According to this configuration, the impedance adjusting portion can be prevented from interfering with the opening edge of the male outer conductor when the female outer conductor is accommodated into the male outer conductor.

Details of Embodiment of Present Disclosure

Embodiment

A specific embodiment of the present disclosure is described below with reference to FIGS. 1 to 6. Note that the present invention is not limited to these illustrations and is intended to be represented by claims and include all changes in the scope of claims and in the meaning and scope of equivalents.

Figure 4:
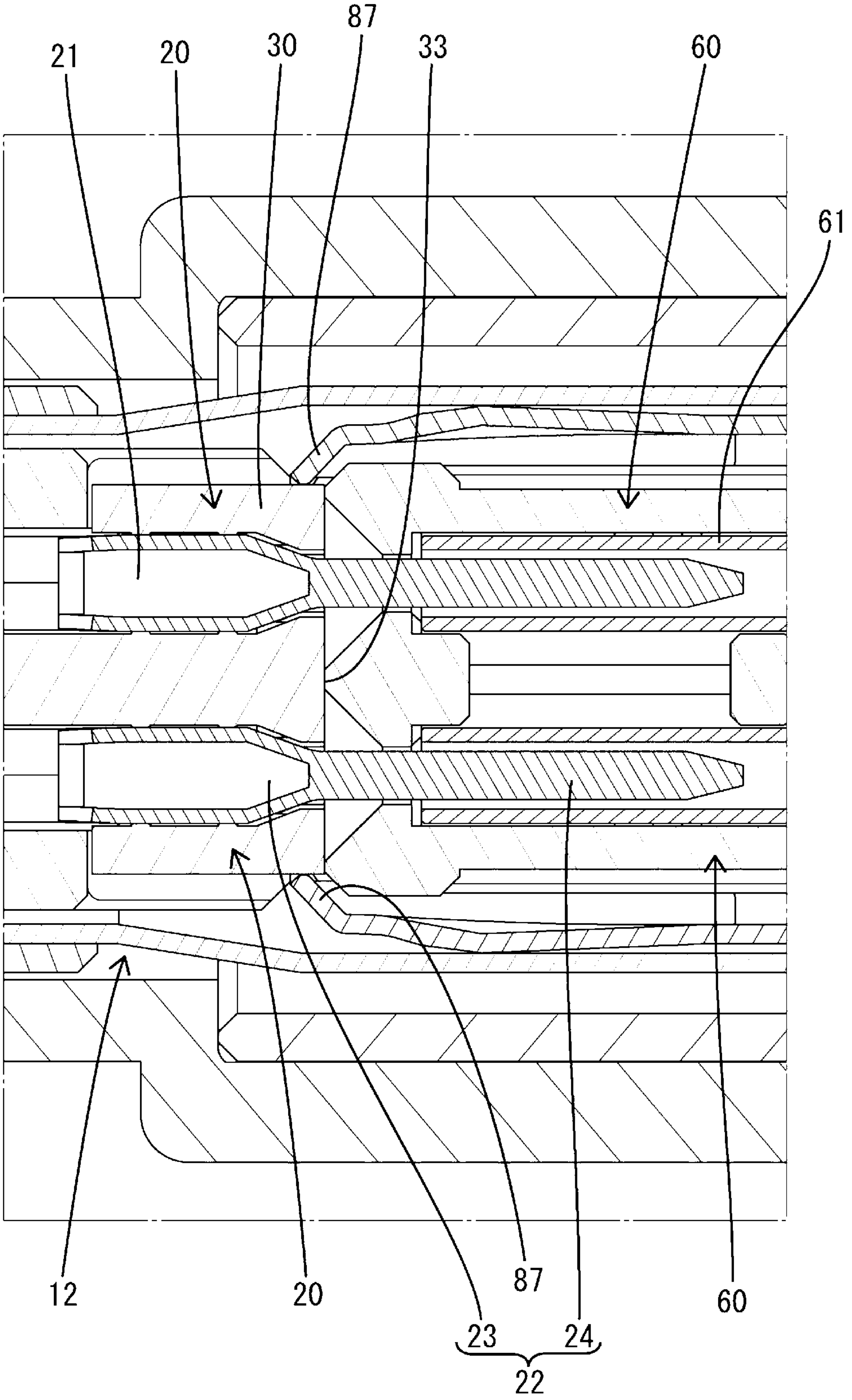
FIG. 4 is a partial enlarged plan view in section showing the connected state of the male connector and the female connector.
Figure 5:
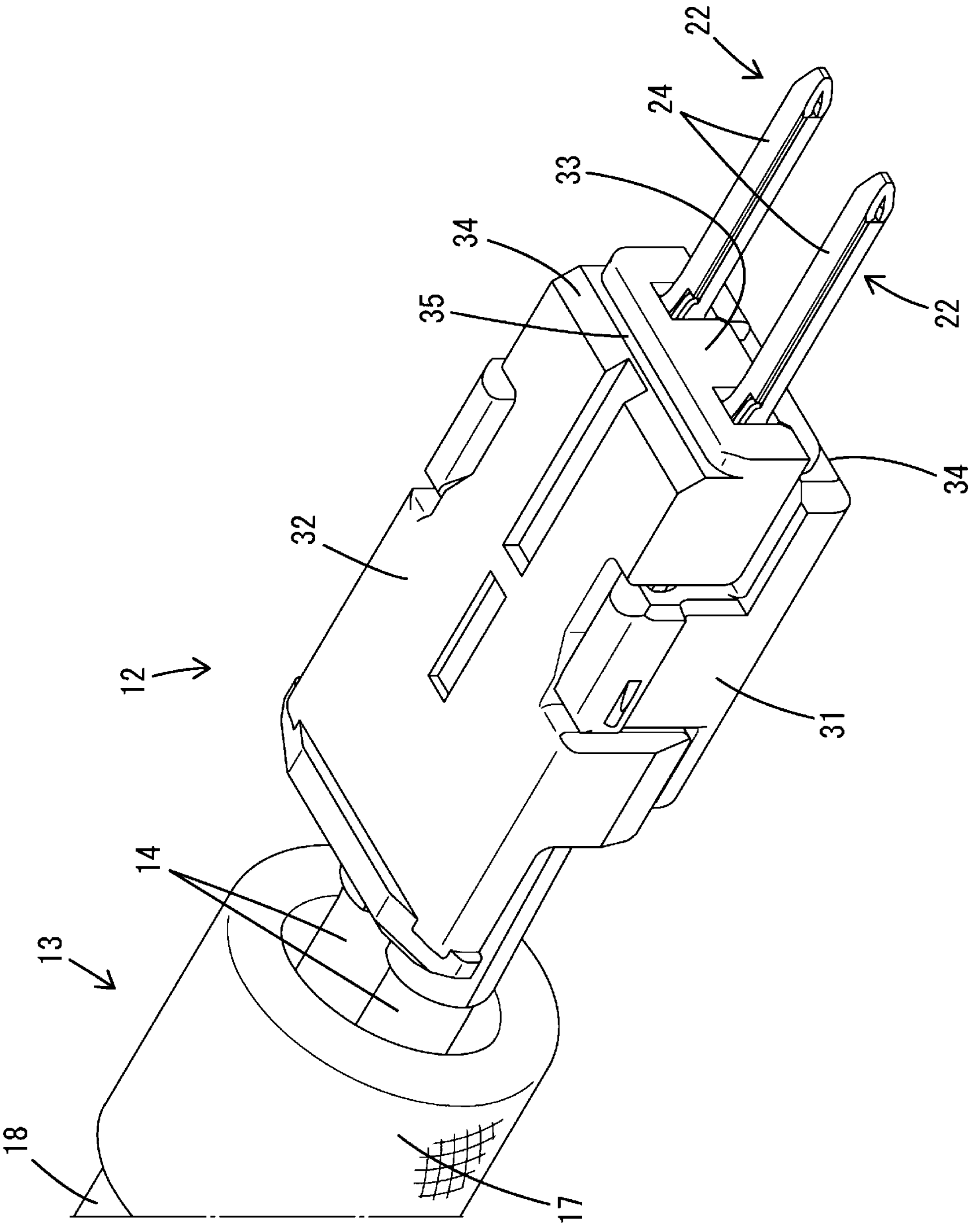
FIG. 5 is a perspective view showing a state where a male outer conductor is removed in a male shield terminal.
Figure 6:
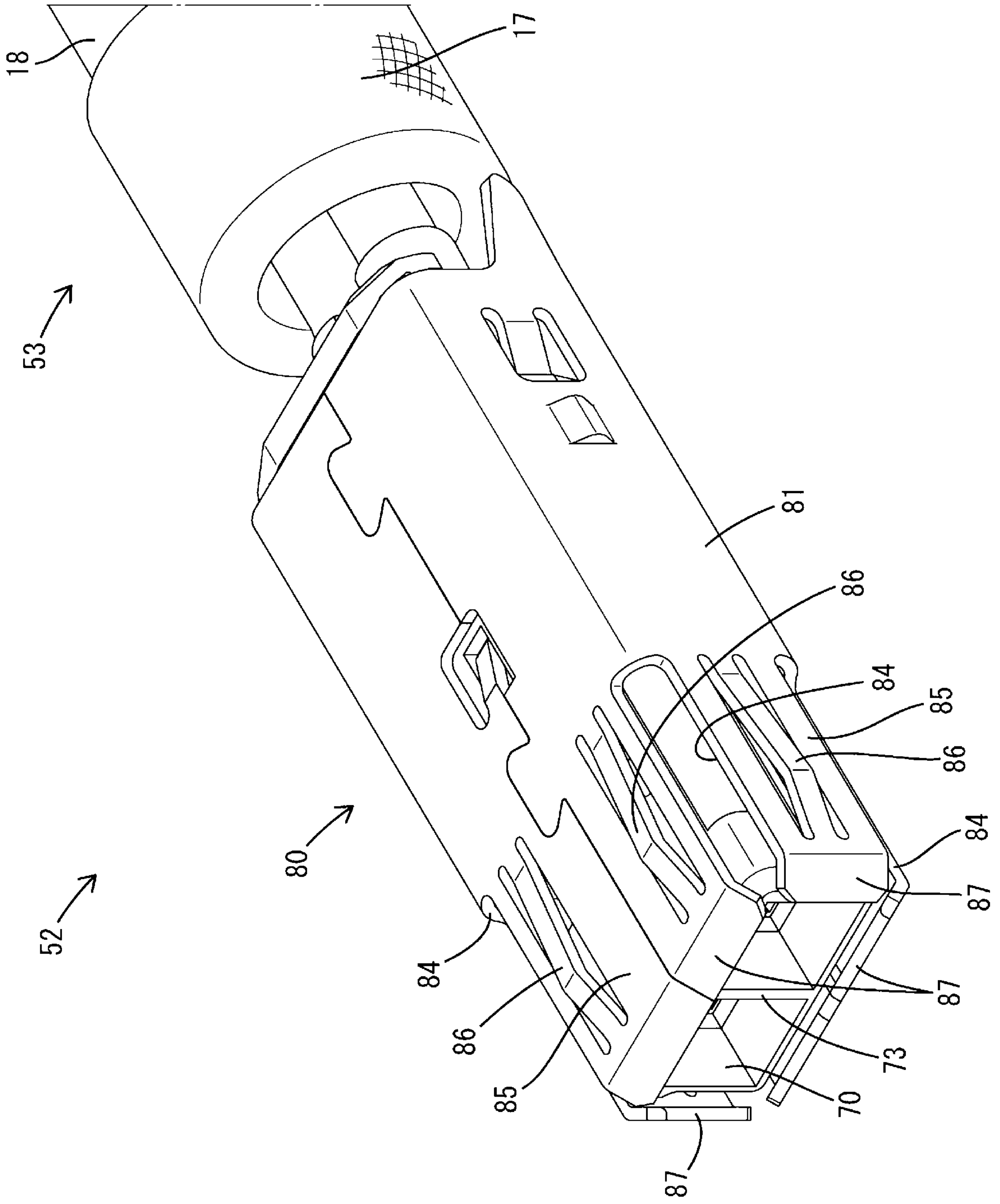
FIG. 6 is a perspective view of a female shield terminal.

A shield connector of this embodiment is provided with a male connector 10 and a female connector 50. In this embodiment, a right side in FIGS. 1, 3 and 4 and an oblique right lower side in FIG. 5 are defined as a front side concerning a front-rear direction of the male connector 10. A left side in FIGS. 2 to 4 and an oblique left lower side in FIG. 6 are defined as a front side concerning a front-rear direction of the female connector 50. That is, the front-rear directions of the male connector 10 and the female connector 50 are defined as mutually opposite directions. Upper and lower sides shown in FIGS. 1 to 3, 5 and 6 are directly defined as upper and lower sides concerning a vertical direction orthogonal to a connecting direction of the both connectors. The vertical direction and a height direction are used as synonyms. A lateral direction and a width direction are used as synonyms.

Male Connector 10

As shown in FIG. 1, the male connector 10 includes a male housing 11 and a male shield terminal 12 mounted in the male housing 11. The male shield terminal 12 is connected to a front end part of a male shielded cable 13. The male shielded cable 13 and the male shield terminal 12 constitute a differential transmission line for high speed communication.

The male shielded cable 13 is a STP (Shielded Twisted Pair) cable and includes two coated wires 14, a shield layer 17 surrounding the both coated wires 14, and a sheath 18. Front end parts of the two coated wires 14 extend forward from the sheath 18. A front end part of the shield layer 17 is folded rearward to surround the outer peripheral surface of the sheath 18.

The male shield terminal 12 is configured by assembling a pair of inner conductors 20, a male dielectric 30 made of synthetic resin and a male outer conductor 40. The male inner conductor 20 is a single component formed into a shape elongated in the front-rear direction as a whole by applying bending and the like to a metal plate material. The male inner conductor 20 includes a supporting portion 21 in the form of a rectangular tube, a tab 22 projecting forward from the supporting portion 21 and a male crimping portion 25 extending rearward from the supporting portion 21. The male crimping portion 25 includes a wire barrel portion 26 in the form of an open barrel and an insulation barrel portion 27 in the form of an open barrel. The wire barrel portion 26 is crimped to a core wire 15 of the coated wire 14. The insulation barrel portion 27 is crimped to the outer peripheral surface of an insulation coating 16 of the coated wire 14.

The tab 22 includes a base end portion 23 connected to the front end of the supporting portion 21 and a connecting function portion 24 elongated forward from the base end portion 23. The base end portion 23 of the tab 22 has a rectangular pyramid shape projecting forward from the outer peripheral edge of the front end of the supporting portion 21 and having outside dimensions gradually reduced toward the front. A projecting direction of the connecting function portion 24 is a direction parallel to the connecting direction of the male connector 10 and the female connector 50. Outside dimensions of the connecting function portion 24 are smaller than those of the supporting portion 21. A height of the connecting function portion 24 is smaller than that of the supporting portion 21 and a width of the connecting function portion 24 is smaller than that of the supporting portion 21.

Figure 3:
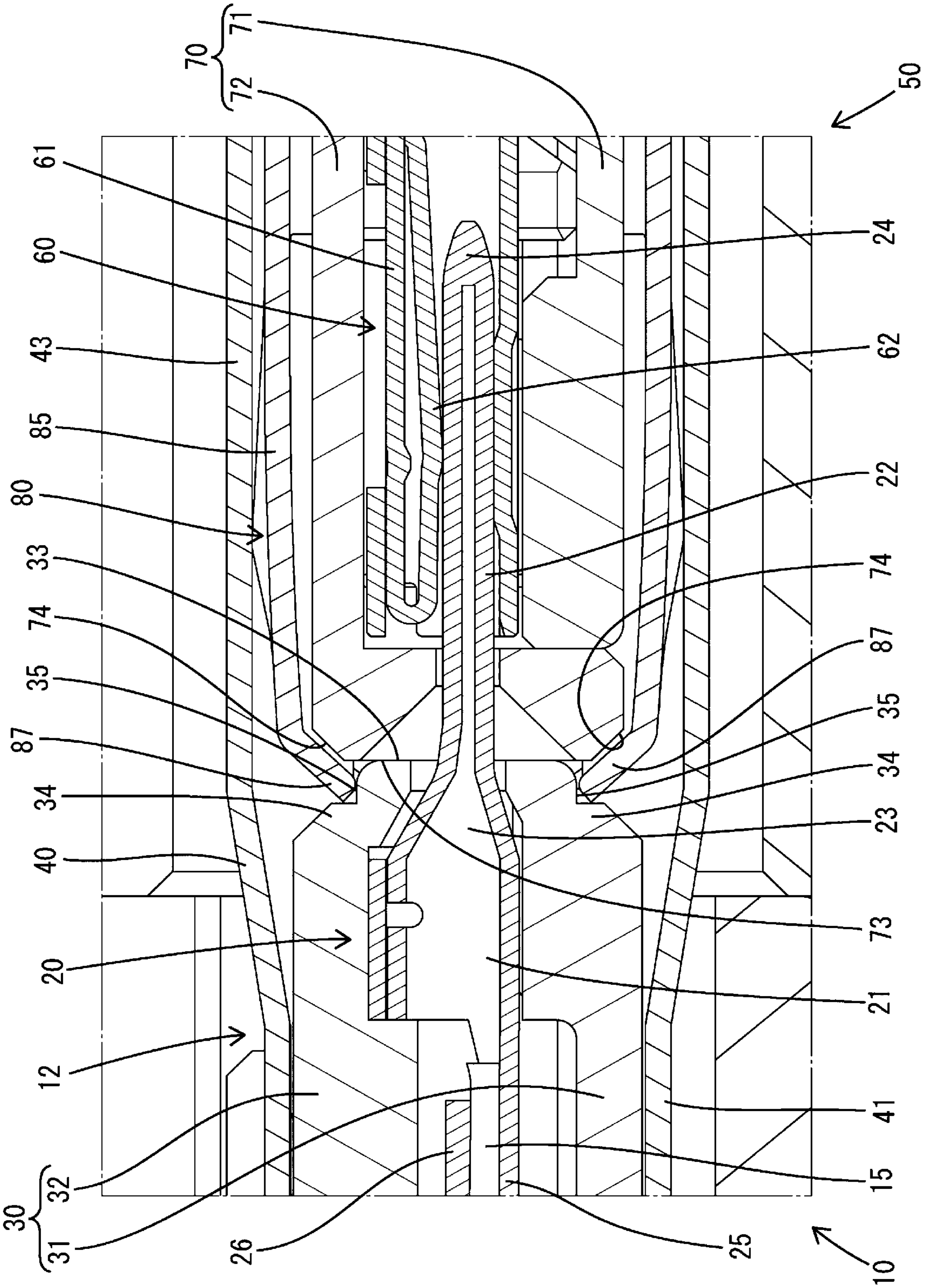
FIG. 3 is a partial enlarged side view in section showing a connected state of the male connector and the female connector.

As shown in FIGS. 3 and 5, the male dielectric 30 is configured by vertically uniting a male lower case 31 and a male upper case 32. The front surface of the male dielectric 30, i.e. a surface facing the male connector 50, is defined as a male connection surface 33. As shown in FIG. 4, the pair of male inner conductors 20 are mounted in the male dielectric 30 while being laterally arranged side by side. The entire supporting portion 21 and the entire male crimping portion 25 and only the base end portion 23 of the tab 22, out of the male inner conductor 20, are accommodated in the male dielectric 30. The connecting function portion 24 of the tab 22 projects forward from the front end surface of the male dielectric 30, i.e. the male connection surface 33 and is exposed.

A thin portion 34 shaped by cutting upper and lower surfaces of the outer peripheral surface of the male dielectric 30 is formed on a front end part of the male dielectric 30. In the front-rear direction, a formation range of the thin portion 34 is substantially the same region as a formation range of the base end portions 23 of the tabs 22. The upper surface of the thin portion 34 is inclined to be lower toward the front on the whole, similarly to the upper surfaces of the base end portions 23 of the tabs 22. The lower surface of the thin portion 34 is inclined to be higher toward the front on the whole, similarly to the lower surfaces of the base end portions 23 of the tabs 22. Each of the upper and lower surfaces of the thin portion 34 is formed with a parallel surface 35. The parallel surface 35 is a flat surface parallel to the connecting direction of the male connector 10 and the female connector 50.

The male outer conductor 40 is configured by assembling a male shell 41 in the form of a rectangular tube and a male crimping member 44 including a male barrel portion 45. The male shell 41 includes a tubular mounting portion 42 and a receptacle 43 extending forward from the front end of the tubular mounting portion 42. The male outer conductor 40 is mounted on the male dielectric 30 while surrounding the male dielectric 30 by the tubular mounting portion 42.

A front end part of the tubular mounting portion 42 is widened in diameter to increase a height and a width toward the front. As shown in FIG. 4, a clearance is formed between the inner peripheral surface of the front end part of the tubular mounting portion 42 and the outer peripheral surface of the male dielectric 30. The receptacle 43 projects further forward than the male connection surface 33.

As shown in FIG. 1, the male barrel portion 45 extends rearward from the male shell 41 and is crimped to the outer peripheral surface of a front end part of the shield layer 17. A front end part of the male shielded cable 13 and a rear end part of the male shield terminal 12 are connected by crimping the male crimping portions 25 of the male inner conductors 20 to the coated wires 14 and crimping the male barrel portion 45 of the male outer conductor 40 to the shield layer 17.

Female Connector 50

Figure 2:
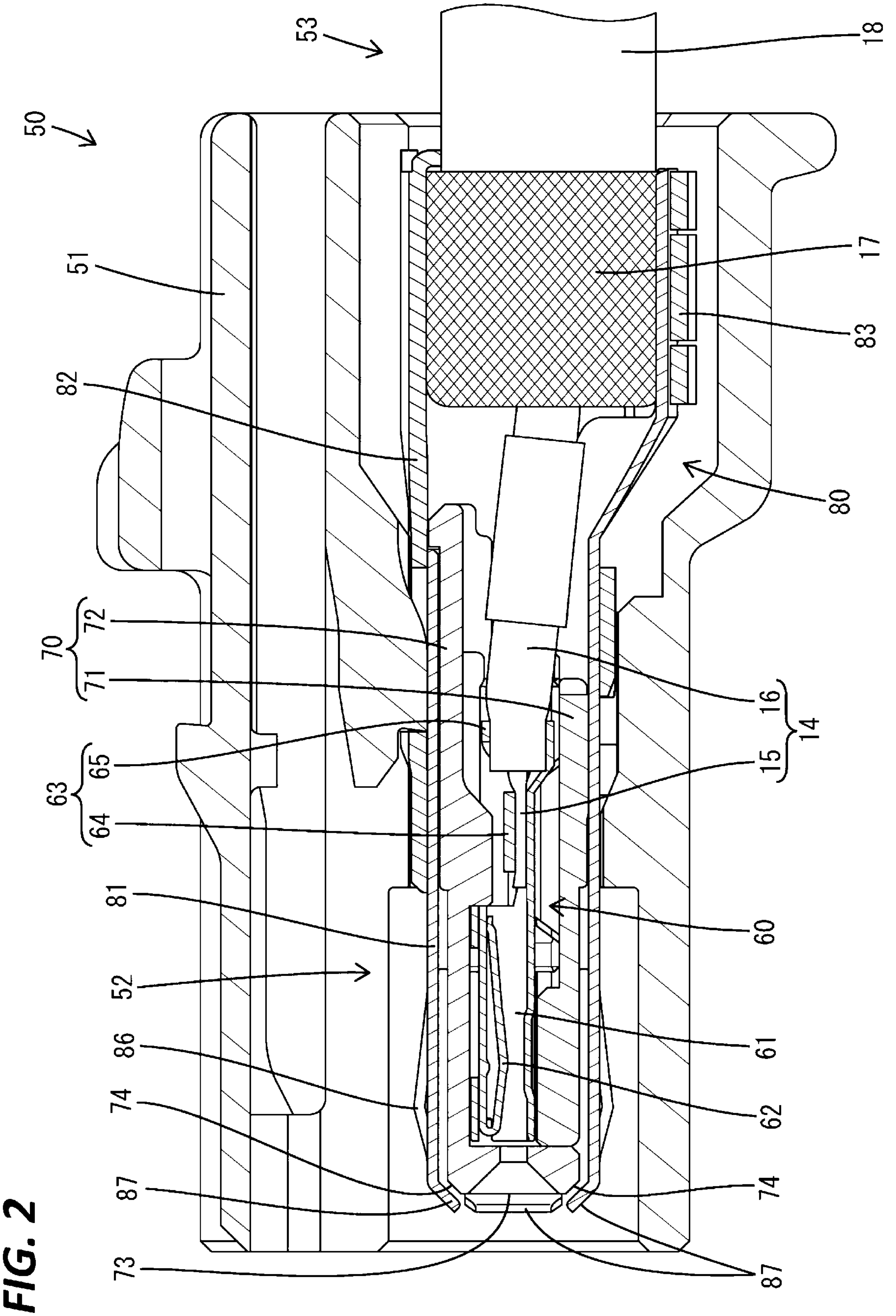
FIG. 2 is a side view in section of a female connector.

As shown in FIG. 2, the female connector 50 includes a female housing 51 and a female shield terminal 52 mounted in the female housing 51. The female shield terminal 52 is connected to a front end part of a female shielded cable 53. Since the female shielded cable 53 has the same configuration as the male shielded cable 13, the same components are denoted by the same reference signs as the male shielded cable 13. The female shielded cable 53 and the female shield terminal 52 constitute a differential transmission line for high speed communication.

The female shield terminal 52 is configured by assembling a pair of left and right inner conductors 60, a female dielectric 70 made of synthetic resin and a female outer conductor 80. The female inner conductor 60 is a single component formed into a shape elongated in the front-rear direction as a whole by applying bending and the like to a metal plate material. The female inner conductor 60 includes a body portion 61 in the form of a rectangular tube and a female crimping portion 63 extending rearward from the body portion 61. A resilient contact piece 62 is accommodated inside the body portion 61. The female crimping portion 63 includes a wire barrel portion 64 in the form of an open barrel and an insulation barrel portion 65 in the form of an open barrel. The wire barrel portion 64 is crimped to a core wire 15 of a coated wire 14 of the female shielded cable 53. The insulation barrel portion 65 is crimped to the outer peripheral surface of an insulation coating 16 of the coated wire 14.

As shown in FIGS. 2 and 3, the female dielectric 70 is configured by vertically uniting a female lower case 71 and a female upper case 72. The front surface of the female dielectric 70, i.e. a surface facing the male connector 10, is defined as a female connection surface 73. The pair of female inner conductors 60 are mounted in the female dielectric 70 while being laterally arranged side by side. A front end part of the female dielectric 70 is formed with a chamfered portion 74 by obliquely cutting the outer peripheral surface of the female dielectric 70. In the front-rear direction, a formation range of the chamfered portion 74 is a region forward of the front ends of the female inner conductors 60.

The female outer conductor 80 is configured by assembling a female shell 81 in the form of a rectangular tube and a female crimping member 82 including a female barrel portion 83. The female outer conductor 80 is mounted on the female dielectric 70 while surrounding the female dielectric 70 by the female shell 81. The female barrel portion 83 extends rearward from the female shell 81 and is crimped to the outer peripheral surface of a front end part of a shield layer 17. A front end part of the female shielded cable 53 and a rear end part of the female shield terminal 52 are connected by crimping the female crimping portions 63 of the female inner conductors 60 to the coated wires 14 and crimping the female barrel portion 83 of the female outer conductor 80 to the shield layer 17.

As shown in FIG. 6, slits 84 are formed in corner edge parts of the female shell 81 in the form of a rectangular tube by being cut rearward from the front end of the female shell 81. Front end side regions of four plate portions in the form of flat plates constituting the female shell 81 are defined by the slits 84 and individually function as resiliently displaceable flexible plate portions 85. Each flexible plate portion 85 is formed with a spring portion 86 by cutting a part of the flexible plate portion 85 and raising the cut part into a chevron shape.

Each flexible plate portion 85 is integrally formed with an impedance adjusting portion 87. The impedance adjusting portion 87 is a part formed by obliquely bending a front end part of the flexible plate portion 85 to a front inner side. A formation range of the impedance adjusting portion 87 in the front-rear direction is a region from the rear end of the chamfered portion 74 of the female dielectric 70 to a position forward of the female connection surface 73 of the female dielectric 70. That is, a front end part of the impedance adjusting portion 87 projects toward the male connector 10 further than the female connection surface 73. The impedance adjusting portion 87 proximately covers the outer surface of the chamfered portion 74. In other words, the impedance adjusting portion 87 is arranged along the outer surface of the chamfered portion 74.

Functions and Effects of Embodiment

With the male connector 10 and the female connector 50 connected, the connecting function portions 24 of the tabs 22 of the male inner conductor 20 are inserted in the body portions 61 of the female inner conductors 60 and resiliently connected to the resilient contact pieces 62. The male connection surface 33 and the female connection surface 73 butt against each other, and front end parts of a pair of upper and lower impedance adjusting portions 87 proximately cover the outer surfaces, i.e. the upper and lower surfaces, of the thin portion 34 of the male dielectric 30. The front end edges (projecting end edges) of the pair of upper and lower impedance adjusting portions 87 are positioned to be proximate to the parallel surfaces 35.

As shown in FIG. 3, out of a differential transmission line constituted by a male inner conductor 20, a region where the supporting portion 21 is formed in the front-rear direction is defined as a non-adjustment region. Out of the differential transmission line, a region where the thin portion 34 surrounds the base end portion 23 of the tab 22 and the impedance adjusting portions 87 cover the outer surfaces of the thin portion 34 is defined as an adjustment region. The non-adjustment region is a region opposite to the male connection surface 33 across the base end portion 23 of the tabs 22, out of the male connector 10. Since outside dimensions of the supporting portion 21 are larger than those of the base end portion 23 of the tab 22 and a metal amount of the supporting portion 21 is more than that of the base end portion 23 of the tab 22, impedance of the non-adjustment region is lower than that of the adjustment region when only the metal amounts are compared.

On the other hand, the thin portion 34 configured to cover the base end portions 23 of the tabs 22 is thinner than a part of the male dielectric 30 configured to cover the supporting portions 21, and the impedance adjusting portions 87 are proximate to the outer surfaces of the thin portion 34. Thus, intervals between the base end portions 23 of the tabs 22 and the impedance adjusting portions 87 (female outer conductor 80) are shorter than intervals between the supporting portions 21 and the male outer conductor 40. Thus, impedance of the adjustment region is lower than that of the non-adjustment region when only the intervals to the outer conductor are compared. Therefore, in view of both a condition on the metal amount and a condition on the interval to the outer conductor, impedance mismatching is reduced on the whole between the adjustment region and the non-adjustment region.

The shield connector of this embodiment is provided with the male connector 10 and the female connector 50. The male connector 10 includes the male inner conductors 20, the male dielectric 30 and the male outer conductor 40. The female connector 50 includes the female inner conductors 60, the female dielectric 70 and the female outer conductor 80. With the male connector 10 and the female connector 50 connected, the male connection surface 33 of the male dielectric 30 and the female connection surface 73 of the female dielectric 70 face and contact each other, the elongated tabs 22 of the male inner conductors 20 project from the male connection surface 33 and are inserted in the female inner conductors 60, and the male inner conductors 20 and the female inner conductors 60 are connected. The thin portion 34 shaped by cutting the outer surfaces of the male dielectric 30 and configured to surround the base end portions 23 of the tabs 22 is formed on an end part of the male dielectric 30 on the side of the male connection surface 33. The female outer conductor 80 is integrally formed with the impedance adjusting portions 87 configured to proximately cover the outer surfaces of the thin portion 34.

Out of the transmission line in the male connector 10, the outside dimensions of the supporting portions 21 constituting the male inner conductors 20 are larger than those of the tabs 22 in the non-adjustment region opposite to the male connection surface 33 across the base end portions 23 of the tabs 22. Since the metal amount of the supporting portions 21 is more than that of the tabs 22, impedance of the non-adjustment region is relatively low. On the other hand, the thin portion 34 of the male dielectric 30 surrounds the base end portions 23 of the tabs 22 on the end part on the side of the male connection surface 33, i.e. in the adjustment region where the base end portions 23 of the tabs 22 are present, out of the transmission line in the male connector 10. Since the thin portion 34 is shaped by cutting the outer surfaces of the male dielectric 30 and relatively thin, the impedance adjusting portions 87 are arranged at positions near the base end portions 23 of the tabs 22. Further, since the impedance adjusting portions 87 proximately cover the outer surfaces of the thin portion 34, large air layers are not interposed between the impedance adjusting portions 87 and the thin portion 34 and between the impedance adjusting portions 87 and the base end portions 23 of the tabs 22. Therefore, impedance of the adjustment region where the base end portions 23 of the tabs 22 are present is also relatively low. According to the shield connector of this embodiment, impedance mismatching between the non-adjustment region and the adjustment region can be reduced.

The impedance adjusting portions 87 are integrally formed to the end part of the female outer conductor 80 on the side of the female connection surface 73. According to this configuration, the impedance adjusting portions 87 can be formed without cutting out parts of the male outer conductor 80. Thus, a reduction in shielding performance due to the formation of the impedance adjusting portions 87 can be avoided.

The parallel surfaces 35 parallel to the connecting direction of the male connector 10 and the female connector 50 and positioned to be proximate to the impedance adjusting portions 87 are formed on the outer surfaces of the thin portion 34. According to this configuration, the interference of the impedance adjusting portions 87 and the outer surfaces of the thin portion 34 can be prevented when the male connector 10 and the female connector 50 are relatively displaced in the connecting or separating direction. Further, since distances between the front end parts of the impedance adjusting portions 87 and the outer surfaces of the thin portion 34 are kept substantially constant when the male connector 10 and the female connector 50 are relatively displaced in the connecting or separating direction, impedance of the adjustment region hardly varies.

The impedance adjusting portions 87 proximately cover the outer surfaces of the female dielectric 70. According to this configuration, since large air layers are not interposed between the impedance adjusting portions 87 and the outer surfaces of the female dielectric 70, an increase in impedance due to the interposed air layers can be suppressed.

With the male connector 10 and the female connector 50 connected, the female outer conductor 80 is accommodated inside the male outer conductor 40. The impedance adjusting portions 87 are inclined inwardly to approach the tabs 22 toward the side of the male connector 10. According to this configuration, the impedance adjusting portions 87 can be prevented from interfering with the opening edge of the male outer conductor 40 when the female outer conductor 80 is accommodated into the male outer conductor 40.

Other Embodiments

Although the impedance adjusting portions are formed only on the female outer conductor in the above embodiment, impedance adjusting portions may be formed only on the male outer conductor or may be formed on both the female outer conductor and the male outer conductor.

Although the thin portion is not accommodated into a recess in the female connection surface in the above embodiment, the thin portion may be accommodated into a recess.

Although the thin portion is formed with the parallel surfaces in the above embodiment, the thin portion may not be formed with the parallel surfaces.

Although the impedance adjusting portions proximately cover the outer peripheral surface of the female dielectric in the above embodiment, the impedance adjusting portions may cover the outer peripheral surface of the female dielectric while being in contact with this outer peripheral surface.

Although the impedance adjusting portions are shaped to cover the outer peripheral surface of the female dielectric in the above embodiment, the impedance adjusting portions may be shaped not to cover the outer peripheral surface of the female dielectric.

Although the impedance adjusting portions are inclined to approach the tabs toward the side of the male connector in the above embodiment, the impedance adjusting portions may be bent.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A shield connector, comprising:

a male connector including a male inner conductor, a male dielectric and a male outer conductor; and a female connector including a female inner conductor, a female dielectric, an impedance adjusting portion and a female outer conductor, wherein:

a male connection surface of the male dielectric and a female connection surface of the female dielectric are facing each other and an elongated tab of the male inner conductor projects from the male connection surface and is inserted in the female inner conductor with the male connector and the female connector connected, a thin portion shaped by cutting an outer surface of the male dielectric and configured to surround a base end portion of the tab is formed on an end part of the male dielectric on the side of the male connection surface, at least one of the female outer conductor and the male outer conductor is formed with the impedance adjusting portion configured to cover an outer surface of the thin portion while being proximate to or in contact with the outer surface of the thin portion, the impedance adjusting portion is formed on an end part of the female outer conductor on the side of the female connection surface, and the female outer conductor is accommodated inside the male outer conductor with the male connector and the female connector connected, and the impedance adjusting portion is inclined inwardly to approach the tab toward the side of the male connector.

2. The shield connector of claim 1, wherein a parallel surface parallel to a connecting direction of the male connector and the female connector and positioned to be proximate to or in contact with the impedance adjusting portion is formed on the outer surface of the thin portion.

3. The shield connector of claim 1, wherein the impedance adjusting portion covers an outer surface of the female dielectric while being proximate to or in contact with the outer surface of the female dielectric.

* * * * *